June 12, 1962  J. T. DUNBECK ETAL  3,038,694
STOPCOCK
Filed April 14, 1960

INVENTORS
JOSEPH T. DUNBECK
AND WALTER K. HANF

BY Clarence R. Patty, Jr.
ATTORNEY

United States Patent Office 3,038,694
Patented June 12, 1962

3,038,694
STOPCOCK
Joseph T. Dunbeck and Walter K. Hanf, Corning, N.Y., assignors to Corning Glass Works, Corning, N.Y., a corporation of New York
Filed Apr. 14, 1960, Ser. No. 22,256
4 Claims. (Cl. 251—181)

The present invention relates to stopcocks and is concerned particularly with improvements in the form of the engaging surfaces thereof.

In the past, engaging surfaces have been frusto-conical in form. According to the present invention, in a stopcock including a plug formed of a slightly elastic material, at least one of the engaging surfaces is provided with a slight convex bulge in the direction of the second engaging surface, said bulge having a maximum in the area where the transverse ports of the stopcock are located.

One object of the present invention is to increase the effectiveness of stopcocks by providing an area of high pressure around the points of seal, while permitting easy turning of the plug due to decreased pressure near its ends.

A further object is to permit an increased rate of production of stopcocks by permitting a lower degree of precision than is required in the manufacture of stopcocks with both surfaces of the conventional frusto-conical form.

Figure 1:
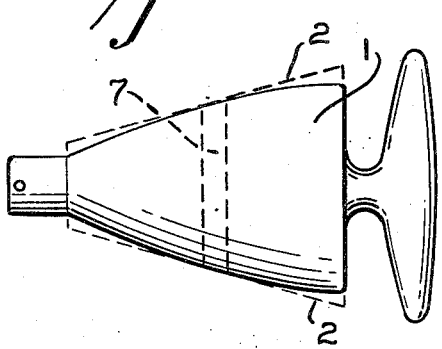
Figure 6:
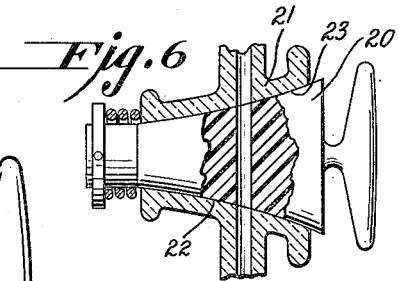
Figure 2:
Figure 3:
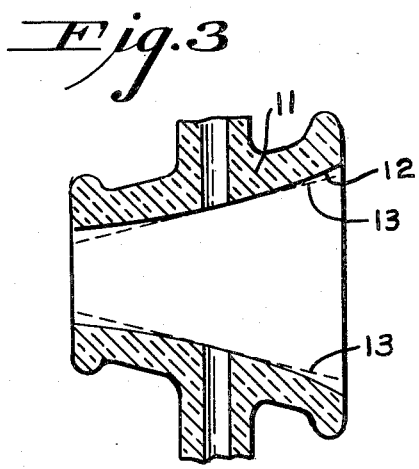
Figure 4:
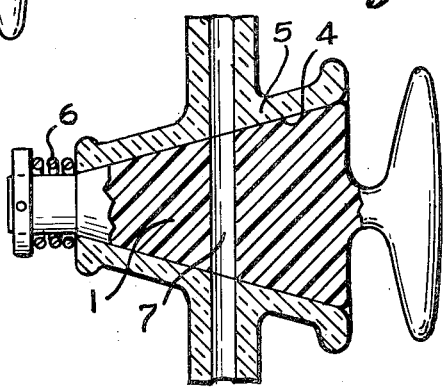
Figure 5:
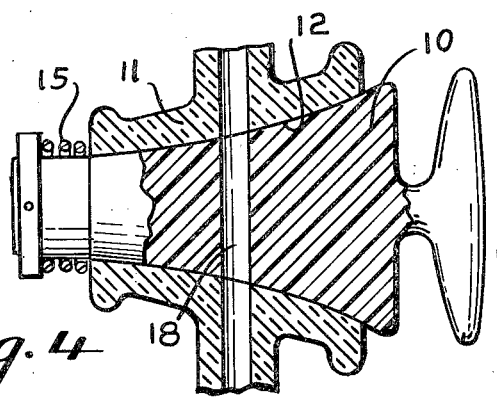
Figure 5:
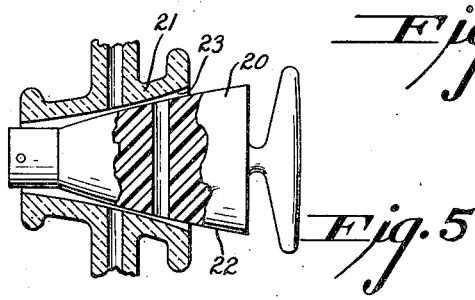

Preferred embodiments of the improved stopcock are illustrated in the accompanying drawings, wherein:

FIG. 1 is a side view of a convex plug with the degree of convexity exaggerated for clarity of illustration, FIG. 2 is an axial sectional view of the plug illustrated in FIG. 1 seated in a frusto-conical stopcock housing, FIG. 3 is an axial sectional view of a housing having a convex bore surface with the degree of convexity exaggerated for clarity of illustration, FIG. 4 is an axial sectional view of a frusto-conical plug seated in the housing illustrated in FIG. 3, FIG. 5 is a partly sectional view of a partially disassembled stopcock assembly employing a plug and a housing each having a convex engaging surface, and FIG. 6 is a view showing the elements of FIG. 5 in their assembled positions.

The plug utilized in the present invention is formed of a chemically inert wax-like synthetic resin stable both chemically and physically at relatively high temperatures and self-lubricating with respect to a smooth surface. The resin, while relatively form retaining, is capable of yielding slightly under pressure and is capable of having its surface conform to the contiguous glass surface of the tapered bore of the stopcock housing. Said resin is non-porous and forms a tight seal with the tapered bore surface, at the same time permitting easy rotation in relation thereto while it is resiliently urged thereinto.

The plug is made preferably of a polytetrahaloethylene synthetic resin, polystyrene, or other synthetic resins having the above-described characteristics. Among such polytetrahaloethylene synthetic resins are polytetrafluoroethylene and polytrifluorochloroethylene.

In FIGS. 1 and 2, illustrating the present invention as embodied in a combination including a convex plug 1 and a housing 5 with a frusto-conical bore surface 4, the basic taper of plug 1, indicated by interrupted lines 2 of FIG. 1, is the same as the taper of plug housing bore surface 4 in FIG. 2. When the plug is resiliently urged by spring 6 into housing 5, its convex sides are pressed straight, and the plug assumes the form of housing bore surface 4, the highest contact pressure between said plug and said bore surface being distributed circumferentially about said plug along a line through the ports of plug channel 7, where compression is greatest.

According to one method of production, a frusto-conical plug blank is made with a taper corresponding to that of housing bore surface 4. The ratio of the change in diameter of such blank to its change in length, which ratio is the basic taper, is preferably of the order of 1:10, although the principles of the present invention are applicable to other basic tapers. The blank is then ground to conform to the described convex shape by removing material so as to decrease the diameter of the plug equally at points equidistant from the circumferential line of maximum bulge. For a plug with the length of one inch, optimal bulge has been found to be within the range approximately .0002 to .0005 inch in diameter.

Such a plug may be formed by other methods as, for example, by casting in a mold.

In FIGS. 3 and 4, illustrating the present invention as embodied in a combination including a frusto-conical plug 10 and a housing 11 having a convex bore surface 12, the basic taper of said housing bore surface 12, indicated by interrupted lines 13 in FIG. 3, is the same as the taper of frusto-conical plug 10. When said plug is resiliently urged by spring 15 into said housing, its frusto-conical sides are compressed so as to conform to the convex housing bore surface 12, the highest contact pressure between said plug and said bore surface being distributed circumferentially about said plug along a line through the ports of plug channel 18, where compression is greatest.

Convex housing 11 in FIG. 3 may be formed by methods analogous to those employed in forming convex plug 1 in FIG. 1. Optimal convexity is within the same range as that employed in said plug.

A third embodiment of the present invention, illustrated in FIGS. 5 and 6, utilizes a convex plug 20 in conjunction with a housing 21 having a convex bore surface 23. In such embodiment, the optimal total bulge of both plug surface 22 and housing bore surface 23, measured in inches, is the same as that of convex plug 1 in FIG. 1.

A stopcock constructed according to the present invention will produce a satisfactory seal when either plug or housing is off taper by as much as .0007 inch per inch of length, as contrasted with a corresponding maximum permissible variation of not more than .0002 inch per inch of length in conventional stopcocks.

What is claimed is:

1. In a stopcock assembly including a plug housing having a generally tapered bore surface conforming to a basic taper and forming the engaging surface thereof, a fluid channel extending through said housing in a direction transverse to its axis and interrupted at two ports in the bore surface thereof, a generally tapered plug therein formed of a chemically inert, non-porous, non-absorbent, relatively hard and generally form retaining wax-like synthetic resin which is slightly elastic under low stress and which is self-lubricating with respect to a smooth vitreous surface and having an engaging surface conforming to a basic taper identical to that of said housing bore surface and having a fluid channel extending transversely therethrough interrupted at two ports in the engaging surface thereof adapted for operative alignment with the ports of said housing bore surface, means for resiliently urging said plug into said housing and means for rotating said plug, the improvement comprising the superimposition of a convex bulge upon the basic taper of at least one of said engaging surfaces, said bulge having its maximum departure from the basic taper along a circumferential line substantially through the ports of the respective engaging surface.

2. A stopcock assembly according to claim 1 in which the plug included therein has a frusto-conical engaging surface.

3. A stopcock assembly according to claim 1 in which the housing included therein has a frusto-conical engaging surface.

4. A stopcock assembly according to claim 1 in which both engaging surfaces are provided with convex bulges having maximum departures from the basic taper along circumferential lines substantially through the respective ports thereof.

References Cited in the file of this patent

UNITED STATES PATENTS

| | | |
|---|---|---|
| 2,617,623 | Voorhorst | Nov. 11, 1952 |
| 2,876,985 | Birchall | Mar. 10, 1959 |